United States Patent [19]

Shiga

[11] Patent Number: 4,533,225

[45] Date of Patent: Aug. 6, 1985

[54] SENSITIVE MATERIAL PROCESSING APPARATUS

[75] Inventor: Koji Shiga, Kanagawa, Japan

[73] Assignee: Fuji Photo Film Co., Ltd., Kanagawa, Japan

[21] Appl. No.: 573,756

[22] Filed: Jan. 25, 1984

[30] Foreign Application Priority Data

| | | | |
|---|---|---|---|
| Jan. 25, 1983 | [JP] | Japan | 58-8752[U] |
| Jan. 25, 1983 | [JP] | Japan | 58-8756[U] |
| Jan. 25, 1983 | [JP] | Japan | 58-10238 |

[51] Int. Cl.$^3$ .......... G03B 3/06

[52] U.S. Cl. .......... 354/322; 354/324; 354/336; 222/95

[58] Field of Search .......... 354/316, 319, 320, 322, 354/324, 325, 336; 222/95, 135, 255, 386.5

[56] References Cited

U.S. PATENT DOCUMENTS

| | | | |
|---|---|---|---|
| 3,774,521 | 11/1973 | Beck | 354/324 |
| 3,838,794 | 10/1974 | Cogley et al. | 222/95 |
| 4,101,919 | 7/1978 | Ammann | 354/319 |
| 4,147,278 | 4/1979 | Uhlig | 222/95 |

*Primary Examiner*—A. A. Mathews

*Attorney, Agent, or Firm*—Sughrue, Mion, Zinn Macpeak & Seas

[57] ABSTRACT

An apparatus for processing a sensitive material, specifically, photographic film which has been exposed, in which the processing liquids and washing water needed for developing, fixing and washing the film are supplied from removable cartridges. Liquid from the various cartridges is pumped to respective developing, fixing and washing stations through a structure which can be selectively inserted into and removed from the respective cartridges. As a result, no piping is required for supplying the processing liquids and washing water from external source to the processing apparatus, thereby simplifying the overall configuration of the apparatus.

6 Claims, 6 Drawing Figures

SENSITIVE MATERIAL PROCESSING APPARATUS

BACKGROUND OF THE INVENTION

The present invention relates to a sensitive material processing apparatus. More particularly, the invention relates to a sensitive material processing method suitable for a so-called camera processor which is combined with a camera for use in copier or the like.

A microfiche camera processor, used for recording various documents on microfilm, should have a simple structure and be easy to operate. For this reason, it is preferable that a closed system be employed in which no piping for liquid supply is employed in a sensitive material processing apparatus (hereinafter referred to as a processor) incorporated in such a device. It is also preferable that operations such as supplementing and replacement of various processing liquids can be performed automatically as much as possible.

An object of the present invention is thus to provide a processor of the desired type described above.

SUMMARY OF THE INVENTION

According to one aspect of the present invention, a processor for processing sensitive material while successively conveying the sensitive material through respective processing tanks for developing, fixing, washing, and the like is provided with a cartridge accommodating section for accommodating cartridges filled with various processing liquids and washing water for use in the respective processing tanks and means for conveying the processing liquids and washing water into corresponding ones of the respective processing tanks, the conveying means being arranged to be capable of being separated from each of the cartridges.

According to another aspect of the present invention, the processor as described above in which processing is performed by supplying the processing liquids and washing water from the respective cartridges is arranged such that, when any one of the cartridges is replaced by a new one, means for supplying the processing liquid or the washing water from the cartridge is caused to move upward relative to the cartridge to separate from the cartridge. The upward movement of the liquid supply means is inhibited for a period of time necessary for the processing liquid or the washing water to be collected into the cartridge.

DESCRIPTION OF THE PREFERRED EMBODIMENTS

Figure 1:
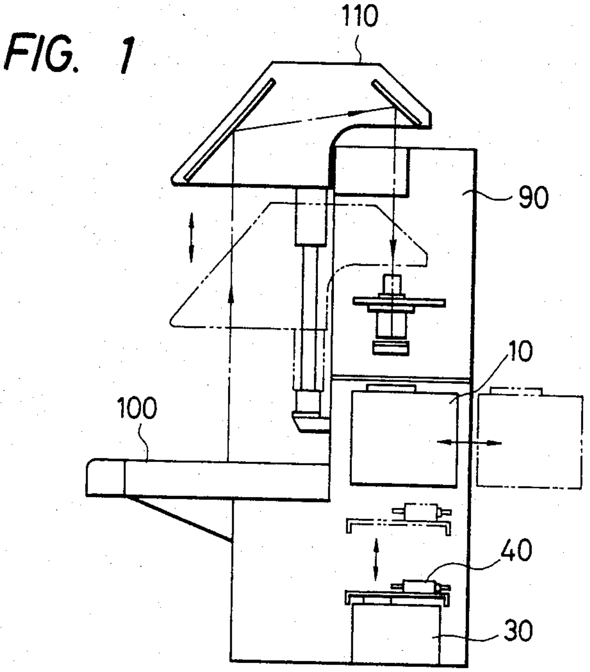
FIG. 1 is a side view showing a processor according to a preferred embodiment of the present invention.

Referring to the drawings, a preferred embodiment of the present invention will be described in detail.

FIG. 1 is a side view showing a processor according to a preferred embodiment of the invention, in which reference numeral 90 denotes a camera section, 100 an original plate, 110 a mirror section for leading light from the original, laid on the original plate 100, to a lens system in the camera, 10 a processing section for photographically processing a photographic film, 30 a cartridge accommodating section in which cartridges for developing liquid and washing water are incorporated, and 40 a feeding section having a plurality of pumps for feeding the developing liquid and washing water to the associated processing sections.

Figure 2:
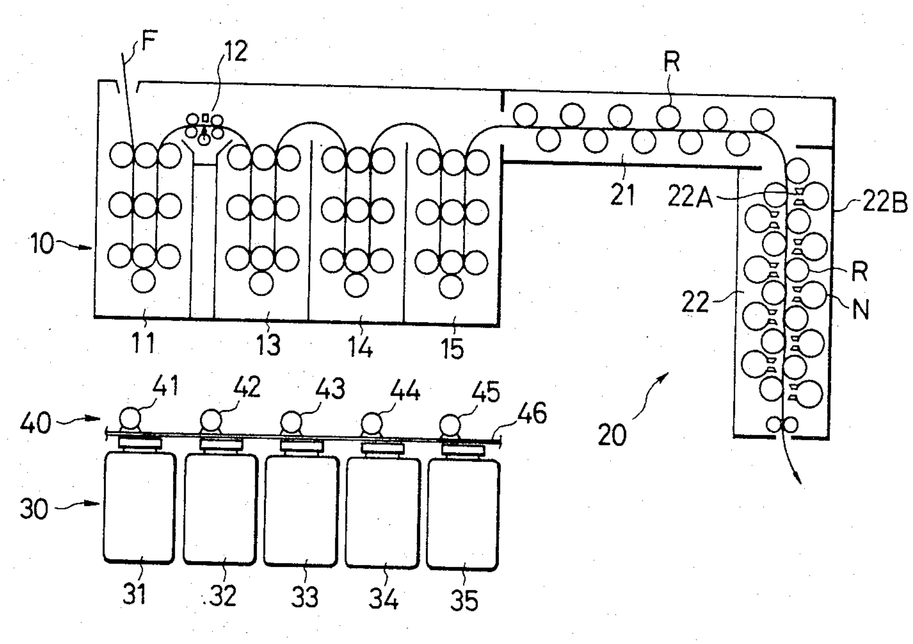
FIG. 2 is a front view showing a primary part of the processor of FIG. 1.

FIG. 2 is a front view showing schematically the processing section 11 which constitutes a primary part of the present invention. In FIG. 2, reference numeral 10 designates a processing section constituted by a development processing section 11, a development-stopping processing section 12 details of which will be explained later, a fixing processing section 13 and water-washing sections 14 and 15. Reference numeral 20 designates a drying section constituted by a squeezing section 21 and a warm-air drier section 22. The cartridge accommodating section 30 accommodates cartridges 31 to 35 holding processing liquid or washing water. Namely, the cartridges 31 and 32 are used for developing liquid, and fixing liquid, respectively, and 34 and 35 are used for water-washing liquids. Reference numeral 40 designates a liquid supply section provided with pumps 41 to 45 for pumping processing liquid or washing water from the cartridges to the corresponding processing sections. Further, F represents a transport path of a sensitive material (hereinafter referred to as film) which has been exposed in the camera section (not shown in FIG. 1).

Among the above-mentioned processing sections, the development processing section 11, the fixing processing section 13 and the water-washing sections 14 and 15 are provided with rollers disposed to transport the film along a U-shaped path during processing. The development-stopping processing section 12 performs development-stopping processing while the film passes through a development-stopping liquid reservoir section constituted by two pairs of small rollers, development-stopping liquid supply tubes and a drip-proof plate at a cross-over portion between the development processing section 11 and the fixing processing section 13. This arrangement provides improved efficiency in development-stopping processing, is space saving, and reduces the processing time.

Figure 5:
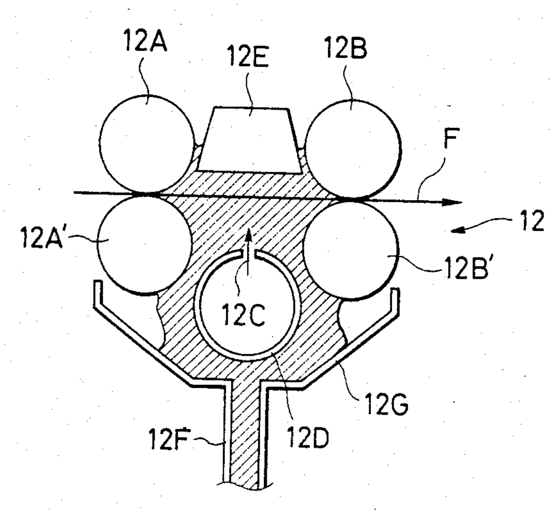
FIG. 5 is a side view showing in detail the development-stopping section of the processor.

FIG. 5 shows the details of the development-stopping section 12. The development-stopping section 12 is constituted by two pairs of sensitive material transporting rollers 12A, 12A′ and 12B, 12B′, each of which has a diameter smaller than that of the rollers used in the other processing sections; a liquid supply pipe 12D provided between the two roller pairs and having injection holes 12C directed to the lower surface (sensitive side) of the film F; a shielding member 12E provided in opposition to the liquid supply pipe 12D; and a tank 12G provided with a liquid discharge pipe 12F. The liquid supply pipe 12D injects development-stopping liquid supplied by a stoppingliquid recirculating pump 42 through the injection holes 12C toward the film F (or toward the shielding member 12E) as indicated by an arrow in FIG. 5.

With reference once more to FIG. 1, the squeezing section 21 is constituted by staggered rollers R, while the warm-air drier section 22 is similarly constituted by staggered rollers R, together with a blast pipes 22B provided in opposition to these rollers R, the pipes 22B being implemented with warm-air injecting nozzles 22A.

In this camera processor, the supply and discharge of the processing liquid and washing water are performed, as mentioned above, with cartridges so as to make it completely unnecessary to provide external piping for supplying the processing liquid and washing water. The processing liquid and washing water supplied by the cartridges are fed into the respective processing tanks and the water-washing tank to there be used in the various processing steps. Developing and fixing liquids are supplied from the cartridges to the respective processing sections in accordance with the amount of film processed. The details of such operations will be described hereunder.

Figure 3A:
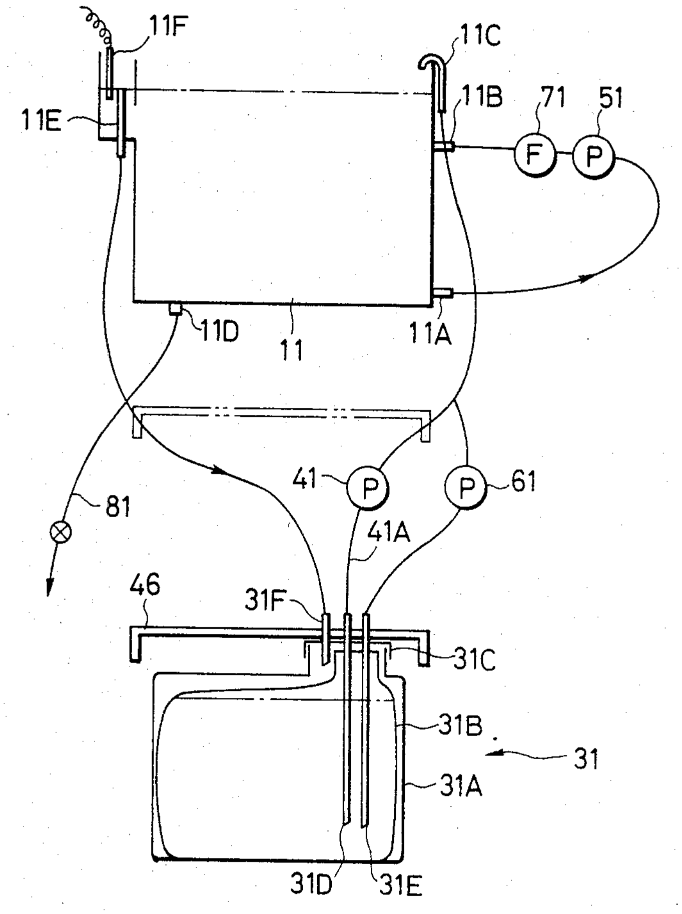
FIG. 3A is a diagram showing the arrangement of the development system of the processor of FIG. 1.

As shown in detail in FIG. 3A, the development processing system is constituted by the development processing section 11, the development liquid cartridge 31, the development liquid supply pump 41, a development liquid circulating pump 51, a development liquid supplement pump 61 and a filter 71. The development tank is provided with liquid inlets/outlets 11A and 11B for connection to the liquid circulating system constituted by the circulating pump 51 and the filter 71, a U-shaped liquid pouring tube 11C connected to the liquid supply pump 41 and the liquid supplement pump 61, a liquid discharge opening 11D to which a liquid discharge pipe 81 provided with a control valve is connected, an overflow pipe 11E, and related components.

The development liquid cartridge 31 includes a bag 31B of a soft plastic material inserted into a container 31A made of a hard plastic material. Development liquid is filled in the inner bag 31B. The space between the container 31A and the bag 31B is used for collecting overflowing development liquid during film processing. A cap 31C of the cartridge 31 is provided with liquid suction pipes 31D and 31E for the liquid supply and supplement pumps 41 and 61 and a liquid receiving pipe 31F connected to the overflow pipe 11E. The liquid suction pipes 31D and 31E are inserted into the inner bag 31B. The liquid receiving pipe 31F has an opening at the outside of the inner bag 31B.

The cartridge cap 31C is arranged to be movable together with the liquid supply pump 41 from the illustrated position in response to the rise of an elevator 46. where it is fitted to the cartridge as shown in FIG. 2 to another position at which the liquid suction pipes 31D and 31E are completely removed from the cartridge 31.

The pumps 41 to 45 are provided on the elevator 46. The developing liquid cap 31C is fixed to a lower surface of the elevator 46 above the liquid supply opening of the developing liquid cartridge 31. The liquid supply pipe 31D provided for the cap 31C passes through the elevator 46 and is connected through a hose 41A to a suction opening of the pump 41. Since a like cap structure is applicable to the other processing systems such as the fixing and washing systems, the explanation therefor is dispensed with.

Figure 3B:
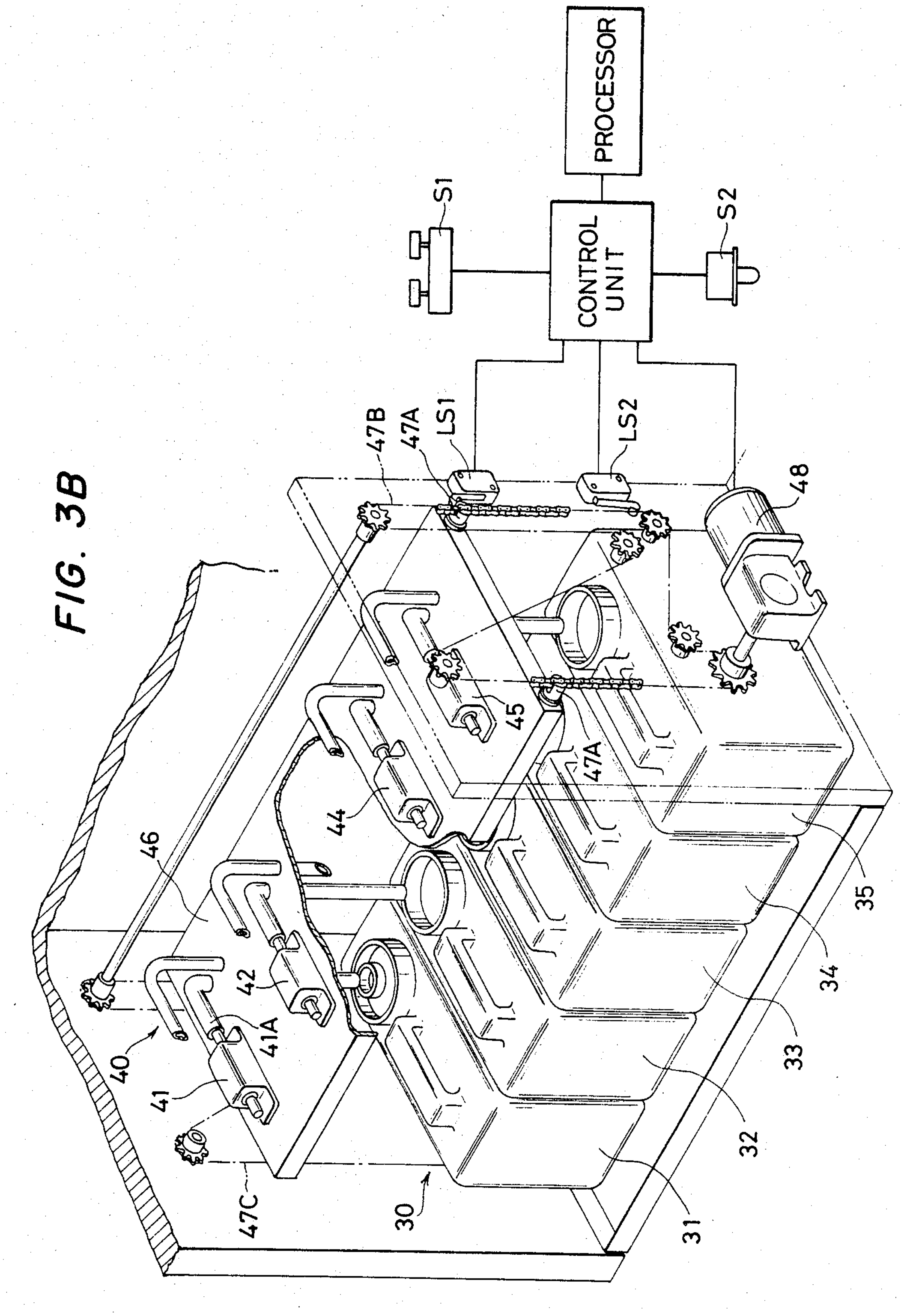
FIG. 3B is a perspective view showing the processor of FIG. 1.

The elevator 46 has two rods each extending from both sides at 47A (FIG. 3B). Chains 47B and C are laid on the rods so as to keep the elevator substantially in a horizontal position. Motor 48 for the elevator is of the reversible type. When the motor 48 is rotated in one direction, an upper limit switch $LS_1$ for the elevator is depressed by a part of the elevator 46. As a result, the elevator 46 is stopped by an electric system. In this condition, the suction pipe 31D is out of the cartridge 31 so that the cartridge 31 may be replaced with new one. When the motor 48 is rotated in the other direction, the elevator 46 is lowered in like manner and is stopped at a lower limit switch $LS_2$, where the developing liquid contained in the cartridge 31 may be pumped out.

The operation of the thus-arranged development processing system constructed according to the present invention will now be described.

(1) Supplying Liquid to the Processing Tank:

By depression of a start switch (not shown), the motor 48 is driven to raise the elevator 46. The liquid supply pump 41 and the cap 31C are then lifted, the first cartridge filled with development liquid is set, and after the downward movement of the elevator 46, the liquid supply pump 41 and the cap 31C are returned back to the position shown by the solid line in FIG. 3A, and the liquid supply pump 41 is actuated. Thus, the development liquid in the inner bag 31B is fed into the processing tank through the hose connected to the tube 11C. If the capacity of the cartridge 31 is substantially equal to that of the processing tank, the processing tank will be fully filled with the development liquid by this operation. Any overflow is collected in the space outside the inner bag 31B in the cartridge 31 from the liquid receiving pipe 31F through a hose connected to the overflow pipe 11E.

(2) Change of Cartridges:

Upon the completion of the above-described operation, the elevator 46 is again lifted and the liquid supply pump 41 and the cap 31C are raised, the first cartridge 31, which is now substantially empty, is removed, and then a second cartridge 31, which is filled with development liquid, is set in place. Next, the elevator 46 is lowered so that the liquid supply pump 41 and the cap 31C are returned back to the position by the solid line shown in FIG. 3A and the supply of liquid is completed.

(3) Processing Operation

The circulation of development liquid, the adjustment of temperature, the supplementing of liquid processing, etc., are effected in the same manner as in an ordinary processor. The development liquid which overflows due to the liquid supplementing operation is collected in the cartridge in the manner described above. If the liquid level in the processing tank drops for any reason, this fact is detected by an electrode switch 11F which actuates the liquid pump 41 which then supplies liquid until the proper level has been recovered.

When the amount of film processed has exceeded a predetermined value or when the film processing time in the processor has exceeded a predetermined value, the development liquid is replaced. For the replacement operation, the control valve of the liquid discharge pipe 81 is opened and the development liquid in the processing tank is received into another container. The inside of the processing tank is cleaned, if necessary, prior to the supply of fresh development liquid. The procedure of supplying the new development liquid is as described above.

The development-stopping system will be described next. The development-stopping system has a small capacity development-stopping liquid reservoir section as described above. The cartridge 32, which is filled with the development-stopping liquid, is a simple container having no inner bag. The cap of the cartridge 32 has a liquid suction pipe and a liquid receiving pipe. The development-stopping system is arranged such that no separate liquid supplying operation is performed and the development-stopping liquid is circulated, at the start of processing, by the liquid supply pump 42 through a path from the cartridge 32 to the pump 42, from there to the development-stopping section 12, and then to the cartridge 32. That is, when the pump 42 is actuated, the development-stopping liquid is injected through the injection holes 12C to form the development-stopping liquid reservoir, which is surrounded by the liquid supply pipe 12D, the shielding member 12E and the rollers 12A, 12A' and 12B and 12B'. The developing of the film F fed into the development-stopping section 12 is stopped immediately. Particularly, the development-stopping liquid is continuously supplied to the sensitive film side (the underside in the drawing) so that the development-stopping processing is performed rapidly and uniformly without permitting irregular development of the film F.

The development-stopping liquid flowing out from the development-stopping liquid reservoir section is collected in the cartridge 32 through the liquid discharge pipe 12F provided in the tank 12G and recirculated.

It is preferable to set the gap between the rollers 12A' and 12B' as narrow as possible so as to prevent the development-stopping liquid from splattering out of the tank. The injection holes 12C are provided in large numbers in the widthwise direction of the apparatus. The shape of the injection holes may be selected as desired. slits may of course be provided instead of injection holes.

The operation of the fixing processing system may be achieved in the same manner as in the development processing system. Thus, an explanation therefor is dispensed with.

The water washing system will now be described. The arrangement of the water washing system is similar to that of the development-stopping system. That is, each of the cartridges 34 and 35 for supplying the washing water has no inner bag, as in the cartridge for the development-stopping liquid, and the cap of the washing water cartridge is arranged in a manner similar to that of the development-stopping liquid cartridge.

In operation, the water washing system performs no separate liquid supply operation and is arranged such that the washing water is circulated by the liquid supply pumps 44 and 45 during processing. Specifically, the washing water is circulated through a path from the cartridge 34 to the pump 44, next to the water-washing processing section 14, and then back to the cartridge 34, and from the cartridge 35 to the pump 45, then to the water-washing processing section 15, and back to the cartridge 35. Small holes for collecting liquid are formed in the bottom of the processing tank so that, when the liquid supply pumps are stopped, the washing water is collected in the respective cartridges.

The liquid level monitoring electrode switch provided in each of the development and fixing processing tanks is periodically supplied with a low voltage for periods of about several seconds every minute to thereby prevent electrolysis of the processing liquid and corrosion of the switch from occurring. The output of the electrode switch may be arranged so as to not only actuate the liquid supply pump, but also to produce an alarm. Further, the output may be used as a timing signal for stopping the liquid supply in the liquid supply operation.

Replacement of the processing liquid may be performed, for example, by using two timers in the following manner. A preset counter is reset when the processing liquid cartridge is replaced. Then, a number corresponding to the allowable amount of processed film for each cartridge is set in the preset counter. Each of the two timers is reset when the processing liquid cartridge is replaced. One of the timers, that is a first timer, is set, for instance, to one week, and the other, the second timer, is set, for instance, to one month. A message "CHANGE CHEMICALS", instructing the operator to replace the processing liquid cartridge, is displayed in response to the output of either the counter or the first timer (whichever is produced first), while another message "CLEAN PROCESSOR", instructing the operator to perform not only the replacement of processing liquid cartridge and the replacement of liquid in each of the development and fixing tanks but also the cleaning of the processor, is displayed at the time when the output of either the counter or the first timer is produced (whichever is produced first) after the second timer has produced its output. Doing so will maintain the system in good operating order.

Figure 4:
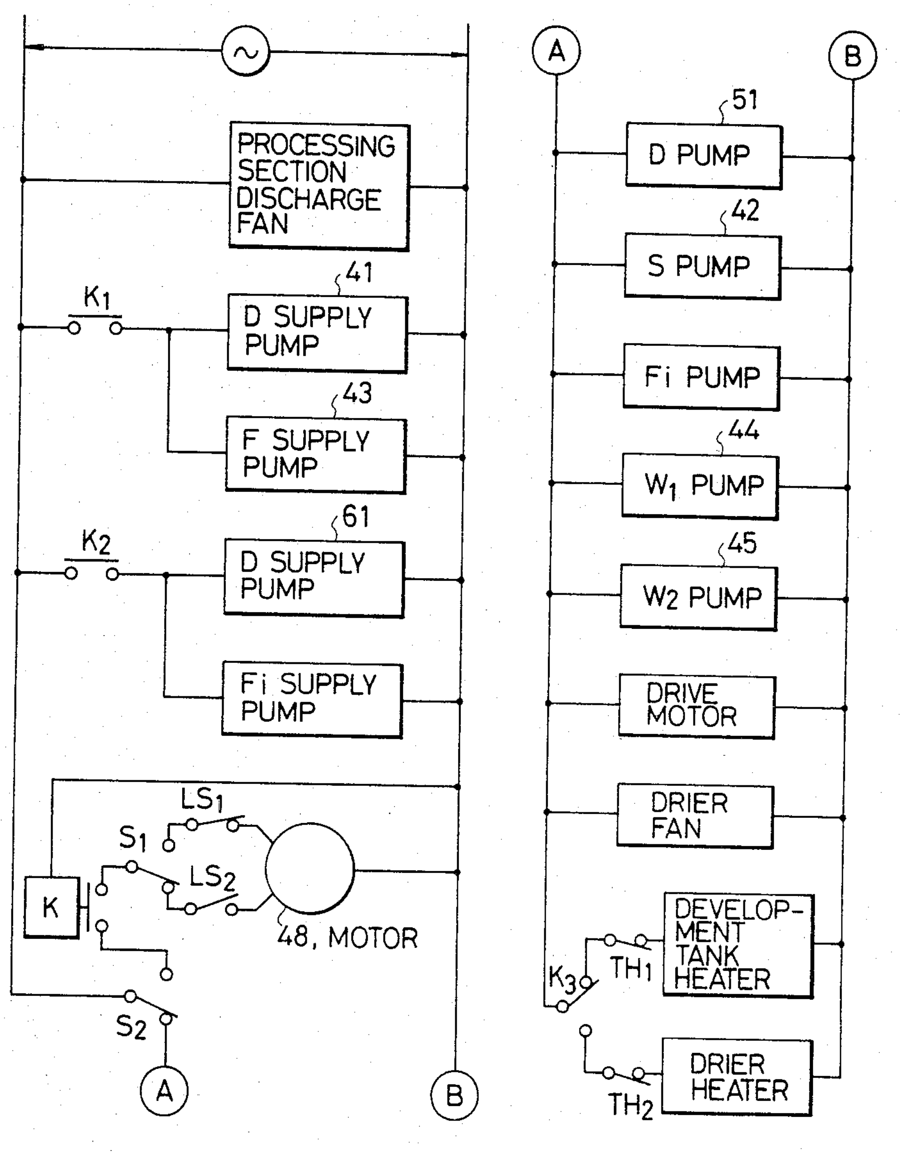
FIG. 4 is a diagram showing the arrangement of the electrical connections of the processor.

FIG. 4 shows schematically the electric connection of the processor of a control unit shown in FIG. 3B. In FIG. 4, $K_1$ represents a liquid supply pump switch, $K_2$ a liquid supplement pump switch, $K_3$ a temperature adjustment switch of the developer-temperature priority type, $K_4$ an elevator motor switch, $S_1$ an elevator switch, $S_2$ a liquid supply section door open/closed detecting switch, $LS_1$ an elevator upper limit switch, $LS_2$ an elevator lower limit switch, and $TH_1$ and $TH_2$ thermostats. D, S, F, $W_1$, and $W_2$ indicate, respectively, the development liquid, the development-stopping liquid, the fixing liquid, and the washing water in the two tanks. As is apparent from the drawing, the supply of the development liquid and the fixing liquid are always actuated at the same time. In this arrangement, the elevator moves the cap of the respective processing liquid cartridge in and out of engagement with the cartridge (it is a matter of course that the liquid supply pump may be moved together with the cap). The elevator is connected to be actuatable only when the door of the liquid supply section is opened.

The developer-temperature priority-type temperature adjustment switch $K_3$ is arranged to be allowed to be set to the heater side of the drier section only when the heater of the development liquid tank is in its OFF state. The resultant effect is that the overall electric power requirement of the processor can be reduced.

The elevator motor switch $K_4$ of the delay operation type includes a delay element so that the elevator is prevented from being operated for a period sufficient for the development-stopping liquid and the washing water to be collected in their respective cartridges, even if the elevator switch is operated immediately after the processor has been stopped.

Arranged in the manner as mentioned above, in the method of the described preferred embodiment, the processor system, which is supplied with the processing-liquid or washing-water from respective cartridges, can be highly automated. When a cartridge needs to be replaced, it can be done without difficulty and without fouling the apparatus or the hands of the operator.

It is a matter of course that the arrangement of the embodiment described above is a mere example and the present invention is not limited to the described embodiment. For example, in the case where a liquid supply pump is employed for supplying processing liquid or washing water from the processing liquid cartridge to a processing tank, the separation of the liquid supply structure from the cartridge may be effected merely by raising only a liquid suction pipe portion of the inserted liquid supply pump, or, alternatively, the cartridge can be lowered.

It is a matter of course that the switches $K_1$ to $K_4$ as illustrated in the embodiment as described above may be arranged as switching elements which are controlled by a microcomputer so that the operation thereof is subjected to programmed processing by the microcomputer.

I claim:

1. An apparatus for a processing sensitive material by conveying said sensitive material through a plurality of serially arranged processing sections including a developing section, a development-stopping section, a fixing section and a washing section, comprising; a plurality of removable cartridges for containing processing liquids and washing-water for use in respective ones of said sections; means for conveying said processing liquids and said washing-water from said cartridges to said respective ones of said sections; means for replacing any one of said cartridges; and movable platform means for separating said conveying means from respective ones said cartridges.

2. The apparatus of claim 1, wherein said movable platform comprises means for lifting said conveying means upwardly from the respective cartridges to separate said conveying means from said cartridges.

3. The apparatus of claim 2, wherein said means for lifting said conveying means upwardly further comprises means for inhibiting upward movement for a period of time necessary for said processing liquid or said washing-water to be collected in the respective one of said cartridges upon commencement of a cartridge-replacement operation.

4. The apparatus of claim 1, wherein one of said cartridges is filled with a development liquid contained in a bag disposed in said one of said cartridges.

5. The apparatus of claim 4, wherein, in said means for conveying said processing liquids and said washing water, an overflow of said development liquid is collected in a space between an outer surface of said bag and an inner surface of the respective cartridge.

6. The apparatus of claim 1, said development-stopping section including: two pairs of rollers through which the sensitive material passes, said pairs of rollers being spaced from each other; means for shielding on one side a space defined by said two pairs of rollers and means for injecting development-stopping liquid into said space.

* * * * *